(12) United States Patent
Nishiyama (10) Patent No.: US 11,662,272 B2
(45) Date of Patent: May 30, 2023

(54) TIRE WEAR ESTIMATION METHOD

(71) Applicant: BRIDGESTONE CORPORATION, Tokyo (JP)

(72) Inventor: Kenta Nishiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 310 days.

(21) Appl. No.: 17/267,892

(22) PCT Filed: Sep. 26, 2019

(86) PCT No.: PCT/JP2019/037991
§ 371 (c)(1),
(2) Date: Feb. 11, 2021

(87) PCT Pub. No.: WO2020/071249
PCT Pub. Date: Apr. 9, 2020

(65) Prior Publication Data
US 2021/0208029 A1    Jul. 8, 2021

(30) Foreign Application Priority Data
Oct. 5, 2018   (JP) .............................. JP2018-190290

(51) Int. Cl.
*B60C 23/06* (2006.01)
*G01M 17/02* (2006.01)
*B60C 11/24* (2006.01)

(52) U.S. Cl.
CPC ......... *G01M 17/025* (2013.01); *B60C 11/246* (2013.01); *B60C 23/061* (2013.01); *B60C 23/065* (2013.01)

(58) Field of Classification Search
CPC .. G01M 17/02; G01M 17/022; G01M 17/021; G01M 17/024; G01M 17/025;
(Continued)

(56) References Cited

U.S. PATENT DOCUMENTS 6,269,690 B1    8/2001  Shimizu et al.
8,483,976 B2 *  7/2013  Morinaga ............. B60C 23/064
                                                     702/34
(Continued)

FOREIGN PATENT DOCUMENTS

CN    101932458 A    12/2010
CN    104369628 A     2/2015
(Continued)

OTHER PUBLICATIONS

Extended European Search Report dated Jun. 17, 2022 in European Application No. 19869327.7.
(Continued)

*Primary Examiner* — Andre J Allen
(74) *Attorney, Agent, or Firm* — Sughrue Mion, PLLC (57) ABSTRACT

A method for efficiently estimating a degree of wear of a tire in which a normalized deformation speed index is set as a wear measure. The normalized deformation speed index is obtained by normalizing an index of a deformation speed near an edge of a tire contact patch, the index being calculated from magnitudes of peaks appearing in a radial acceleration waveform obtained by differentiating tire radial acceleration detected by an acceleration sensor. The degree of wear of the tire is estimated using the wear measure, the ground contact time ratio, a worn tire approximate formula and an approximate formula when a tire is new, which have been obtained in advance and each represents a relationship between the wear measure and the ground contact time ratio obtained by running a plurality of tires having tire sizes different from each other.

5 Claims, 6 Drawing Sheets

(58) Field of Classification Search
CPC .. G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/046; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 14/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC ............................................... 73/146–146.8
See application file for complete search history.

(56) References Cited

U.S. PATENT DOCUMENTS

| 8,558,680 | B2 | 10/2013 | Pannek |
| 9,259,976 | B2 | 2/2016 | Singh et al. |
| 9,766,208 | B2 | 9/2017 | Sakaguchi |
| 10,059,316 | B2 | 8/2018 | Hanatsuka |
| 10,286,734 | B2 | 5/2019 | Masago |
| 10,495,457 | B2 | 12/2019 | Cyllik et al. |
| 2006/0111853 | A1 | 5/2006 | Ogawa |
| 2010/0186492 | A1 | 7/2010 | Morinaga |

(56) References Cited

U.S. PATENT DOCUMENTS

| | | | |
|---|---|---|---|
| 2018/0079262 A1 | 3/2018 | Masago | |
| 2018/0188025 A1 | 7/2018 | Cyllik et al. | |

FOREIGN PATENT DOCUMENTS

| | | | | |
|---|---|---|---|---|
| CN | 105793687 A | 7/2016 | | |
| CN | 105934397 A | 9/2016 | | |
| CN | 106061761 A | 10/2016 | | |
| CN | 106515318 A | 3/2017 | | |
| CN | 107379898 A | 11/2017 | | |
| CN | 107614294 A | 1/2018 | | |
| CN | 107848344 A | 3/2018 | | |
| EP | 3 159 189 A1 | 4/2017 | | |
| EP | 3551478 B1 * | 12/2020 | ........... | B60C 11/243 |
| JP | 11-326144 A | 11/1999 | | |
| JP | 2006-151057 A | 6/2006 | | |
| JP | 2007-153034 A | 6/2007 | | |
| JP | 2009-61917 A | 3/2009 | | |
| JP | 2009-292434 A | 12/2009 | | |
| JP | 2010-159031 A | 7/2010 | | |
| JP | 2010159031 A * | 7/2010 | ........... | B60C 11/246 |
| JP | 2013-169816 A | 9/2013 | | |
| JP | 2016-190615 A | 11/2016 | | |
| WO | 2009/008502 A1 | 1/2009 | | |
| WO | 2009/157516 A1 | 12/2009 | | |
| WO | WO-2020250517 A1 * | 12/2020 | ........... | B60C 11/246 |

OTHER PUBLICATIONS

International Search Report for PCT/JP2019/037991, dated Dec. 10, 2019.
Chinese Search Report dated Jun. 21, 2022 in Chinese Application No. 201980065180.2.
Written Opinion of the International Searching Authority dated Dec. 10, 2019, in International Application No. PCT/JP2019/037991.

\* cited by examiner

TIRE WEAR ESTIMATION METHOD

CROSS REFERENCE TO RELATED APPLICATIONS

This application is a National Stage of International Application No. PCT/JP2019/037991 filed Sep. 26, 2019, claiming priority based on Japanese Patent Application No. 2018-190290 filed Oct. 5, 2018.

TECHNICAL FIELD

The present invention relates to a method for estimating a degree of wear of a tire from acceleration information detected by an acceleration sensor disposed in the tire.

BACKGROUND

Conventionally, as a method for estimating wear of a tire, there has been proposed a method which includes disposing an acceleration sensor in the tire; calculating a peak level at a leading-edge side or a peak level at a trailing-edge side appearing in a differential waveform of acceleration, which is detected by the acceleration sensor, in a kicked-out tire radial direction; setting the calculated peak level as an index $V_t$ of a deformation speed at a tire contact patch edge or near the tire contact patch edge; calculating a normalized deformation speed index $V'''_t$ which is obtained by normalizing the deformation speed index $V_t$ by a cube of a rotation time $T_r$; and estimating a degree of wear of the tire from the normalized deformation speed index $V'''_t$ and an M-V map representing a relationship, which has been obtained in advance, between a degree of tire wear M and the normalized deformation speed index $V'''_t$ (See, for example, Patent Document 1).

CITATION DOCUMENT

Patent Document

Patent Document 1: WO2009/008502A1

SUMMARY OF THE INVENTION

Technical Problem

Incidentally, since an amount of deflection near the tire contact patch edge changes when a load acting on the tire changes, in the Patent Document 1, it is necessary to prepare a graph in advance, as map, showing a relationship between the normalized deformation speed index $V'''_t$ as a measure of wear and a ground contact time ratio CTR=(ground contact time $T_t$)/(rotation time $T_r$) which is a measure of load, and in order to so, it has been necessary to make the above-mentioned map by performing actual vehicle tests for each tire.

The present invention has been made in view of the conventional problem and aims at efficiently estimating the degree of wear by estimating wear measures of tires of other sizes with the use of data of actual vehicle tests performed for tires of some sizes.

Solution to Problem

An aspect of the present invention relates to a tire wear estimation method for estimating a degree of wear of a tire, in which a normalized deformation speed index is set as a wear measure representing the degree of wear of the tire, the normalized deformation speed index being obtained by normalizing, by a rotation time of the tire, an index of a deformation speed at an edge of a tire contact patch or near the edge of the tire contact patch, the index being calculated from magnitude or magnitudes of one or both of positive and negative peaks appearing in a radial acceleration waveform obtained by differentiating a time-series waveform of tire radial acceleration detected by an acceleration sensor mounted on the tire, the rotation time being a time interval of peaks of either one of the positive and negative peaks appearing in the radial acceleration waveform; and the degree of wear of the tire is estimated using the wear measure and a ground contact time ratio which is a ratio of a ground contact time with respect to the rotation time, the ground contact time being a time interval between the positive peak and the negative peak, wherein the degree of wear of the tire is estimated using the wear measure, the ground contact time ratio and a relationship, which has been obtained in advance, between the wear measure and the ground contact time ratio obtained by running a plurality of tires having tire sizes different from each other.

Note that the above-described summary of the invention does not enumerate all the necessary features of the present invention, and subcombinations of these feature groups can also be the invention.

DESCRIPTION OF EMBODIMENTS

Figure 1:
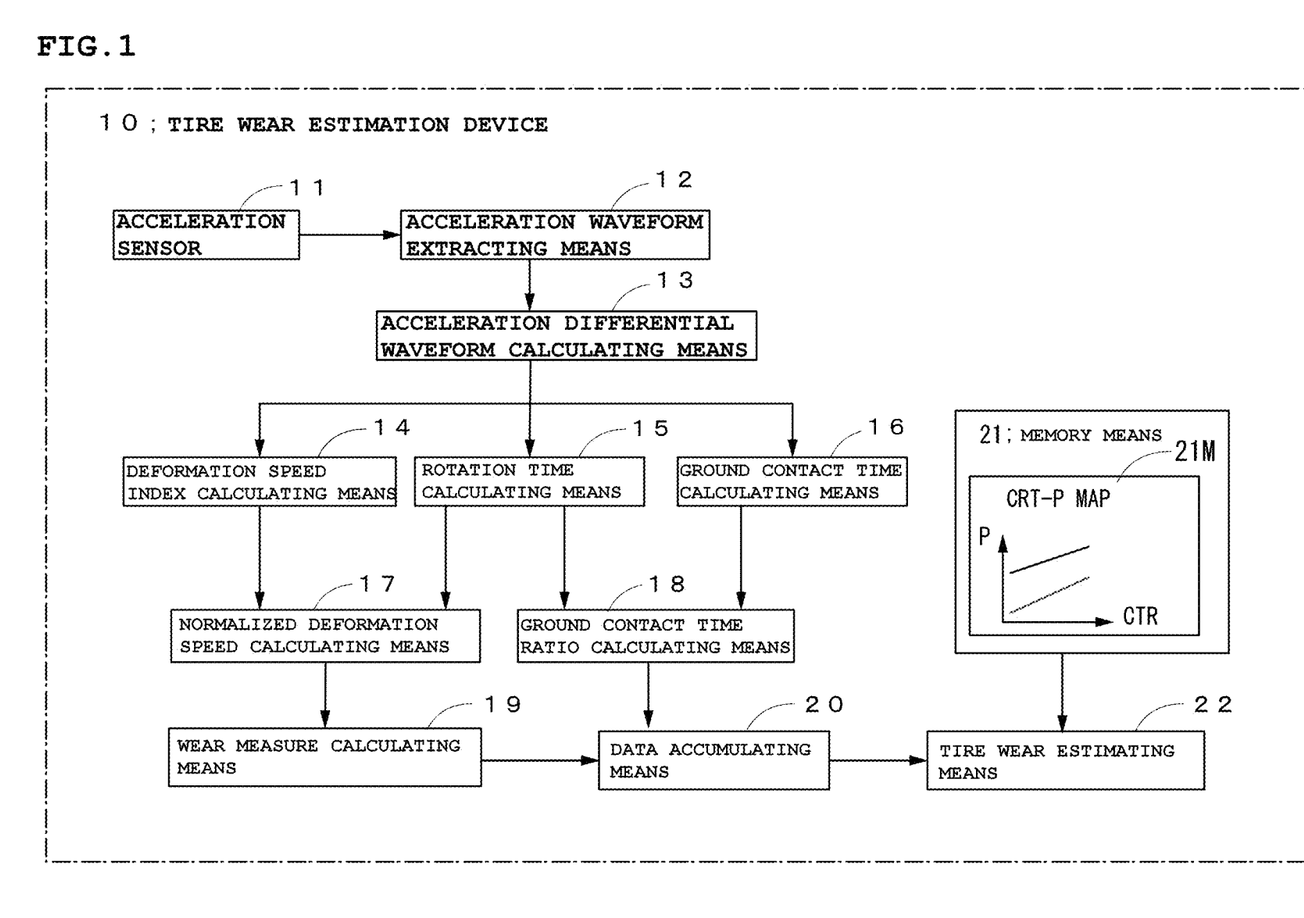
FIG. 1 is a functional block diagram illustrating the configuration of a tire wear estimation device.

FIG. 1 is a functional block diagram illustrating the configuration of a tire wear estimation device 10 according to an embodiment of the present invention. The tire wear estimation device 10 comprises an acceleration sensor 11, an acceleration waveform extracting means 12, an acceleration differential waveform calculating means 13, a deformation speed index calculating means 14, a rotation time calculating means 15, a ground contact time calculating means 16, a normalized deformation speed index calculating means 17, a ground contact time ratio calculating means 18, a wear measure calculating means 19, a data accumulating means 20, a memory means 21, and a tire wear estimating means 22.

Each of the acceleration waveform extracting means 12 to the tire wear estimating means 22 is configured of, for example, computer software and a memory such as a RAM.

Figure 2:
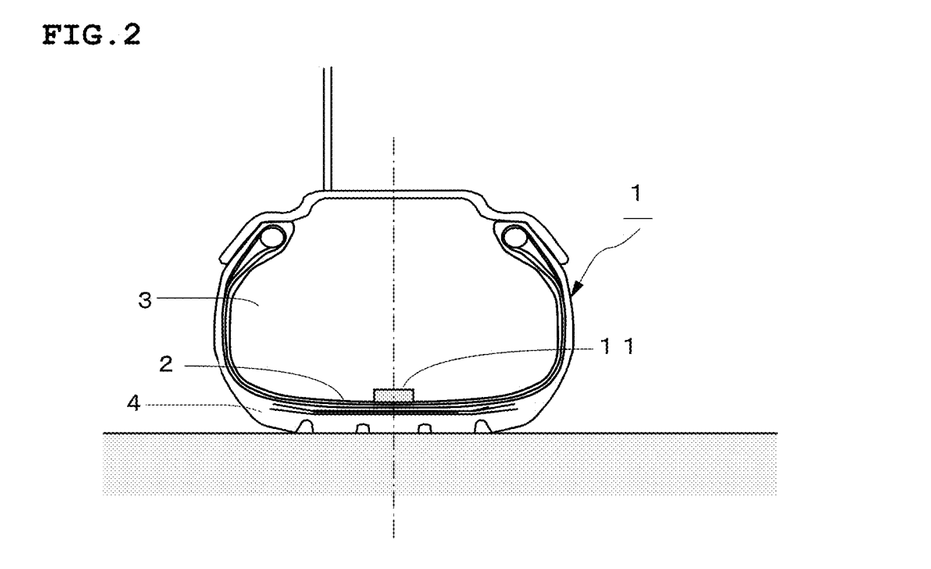
FIG. 2 is a diagram illustrating a mounting example of an acceleration sensor.

As illustrated in FIG. 2, the acceleration sensor 11 is disposed at approximately the center of an inner liner portion 2 of a tire 1 on a tire air chamber side and detects, as acceleration, vibrations input from a road surface to a tread 4 of the tire 1. In this embodiment, the acceleration sensor 11 is disposed so that the detection direction of the acceleration sensor 11 becomes the tire radial direction, to thereby detect the tire radial vibration input from the road surface. Hereinafter, the position of the acceleration sensor 11 (strictly speaking, the position of the surface of the tread 4 located outside the radial direction of the acceleration sensor 11) is referred to as the measurement point.

The acceleration waveform extracting means 12 extracts the radial acceleration waveform which is a time series waveform of the tire radial acceleration acting on the tread 4, which has been detected by the acceleration sensor 11.

Figure 3:
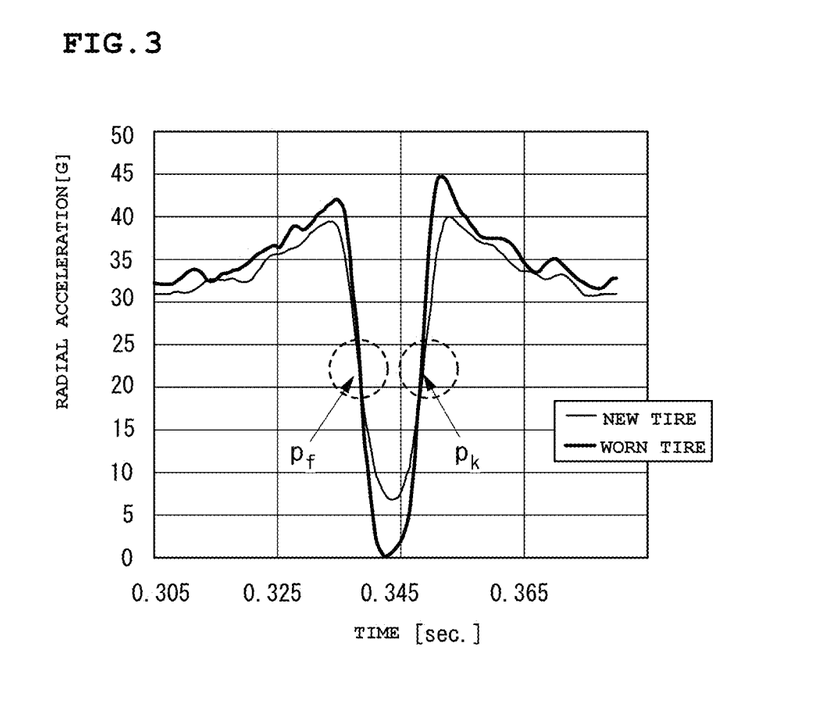
FIG. 3 is a diagram illustrating an example of an acceleration waveform in the tire radial direction.

FIG. 3 illustrates an example of the radial acceleration waveform, where the horizontal axis is time [sec.] and the vertical axis is acceleration [G]. In the figure, the thin solid line represents the radial acceleration waveform of a new tire and the thick solid line represents the radial acceleration waveform of a worn tire.

Figure 4:
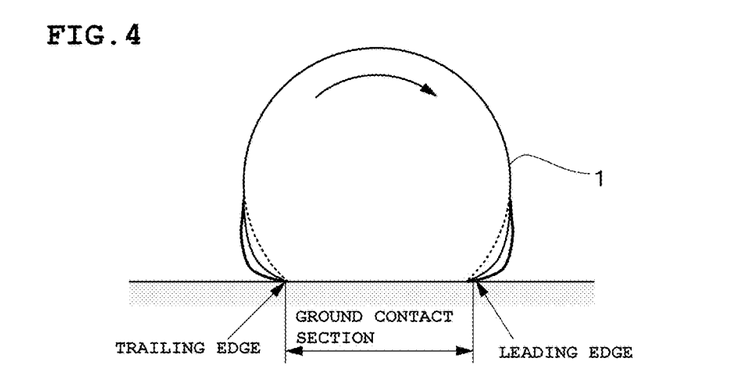
FIG. 4 is a diagram illustrating a tire deformation state.

As illustrated in FIG. 4, when a load is applied to the tire, a portion (the contact patch section in the figure) of the tire being in contact with the road surface is pushed to the tire center direction, and edges of the contact patch such as a leading edge and a trailing edge and portions near the contact patch edges deform to bulge outwardly from an initial profile shown by the dashed lines in the figure. Since, this deformation is greater in the worn tire shown by the thick solid line in the figure than in the new tire shown by the thin solid line in the figure, the deformation speed of the worn tire in the tire radial direction near the contact patch edge becomes greater than that of the new tire. In other words, as illustrated in the radial acceleration waveform in FIG. 3, when the tire wear progresses, the slope of the radial acceleration waveform at the contact patch edges $p_f$ and $p_k$ increases.

The acceleration differential waveform calculating means 13 calculates the acceleration differential waveform which is the waveform obtained by time-differentiating the time-series waveform of the radial acceleration extracted by the acceleration waveform extracting means 12.

Figures 5A, 5B:
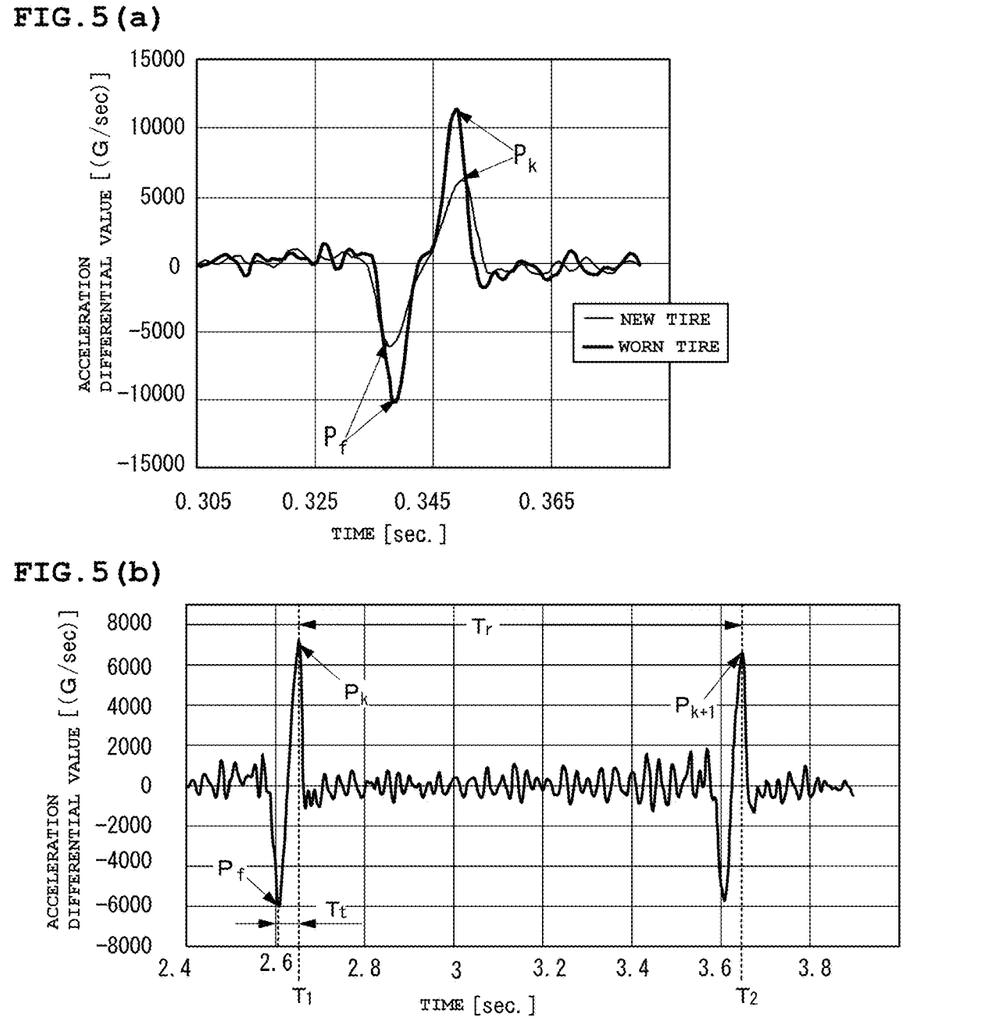
FIGS. 5A and 5B are diagrams respectively illustrating an example of the acceleration differential waveform and a method of calculation of a rotation time and a ground contact time.

FIG. 5A illustrates an example of the acceleration differential waveform, where the horizontal axis is time [sec.] and the vertical axis is the acceleration differential value [G/sec.] In the figure, the thin solid line is the acceleration differential waveform of the new tire, and the thick solid line is the acceleration differential waveform of the worn tire.

Two peaks appear in the acceleration differential waveform. The front side of the waveform, that is, the peak indicated by the point $P_f$ that appears first in time is the peak at the leading-edge side, and the point $P_k$ that appears later in time is the peak at the trailing-edge side.

As shown in the figure, the larger the slope at the contact patch edges $p_f$ and $p_k$ of the radial acceleration waveform illustrated in FIG. 3 becomes, the greater the magnitudes of the peaks $P_f$ and $P_k$ in the acceleration differential waveform become.

As shown in FIG. 5B, the interval between the peak $P_f$ at the leading-edge side and the peak $P_k$ at the trailing-edge side in the acceleration differential waveform is the ground contact time $T_t$, and the interval between the two temporally adjacent peaks $P_k$, $P_{k+1}$ at the trailing-edge side is the rotation time $T_r$, which is the time the tire rotates one rotation.

The deformation speed index calculating means 14 calculates an acceleration differential value at the leading-edge side (hereinafter referred to as the differential peak value side), which is the magnitude of the peak $P_f$ at the leading-edge side, uses this value as a deformation speed index $V_t$, and sends this deformation speed index $V_t$ to the normalized deformation speed index calculating means 17. Incidentally, as the deformation speed index $V_t$, a differential peak value $V_{tk}$ at the trailing-edge side, which is the acceleration differential value on the trailing-edge side, may be used, or an average value of the leading-edge side differential peak value $V_{tf}$ and the trailing-edge side differential peak value $V_{tk}$ may be used.

As illustrated in FIG. 5B, the rotation time calculating means 15 calculates a rotation time $T_r$, which is the time difference between a time $T_1$ when the trailing-edge side peak $P_k$ has appeared and a time $T_2$ when the trailing-edge side peak appears again after one rotation of the tire 1. In other words, $T_r = T_2 - T_1$.

The rotation time $T_r$ may be calculated from the interval of the peak $P_f$ at the leading-edge side instead of the interval of the peak $P_k$ at the trailing-edge side.

The ground contact time calculating means 16 calculates a ground contact time $T_t$, which is the time between the peak $P_f$ at the leading-edge side and the peak $P_k$ at the trailing-edge side.

The normalized deformation speed index calculating means 17 calculates a normalized deformation index $V''_t$, which is obtained by normalizing, with the use of the information on the rotation time $T_r$ calculated by the rotation time calculating means 15, the deformation speed index $V_t$ calculated by the deformation speed index calculating means 14. In this embodiment, a value obtained by multiplying the deformation speed index $V_t$ by the cube of the rotation time is set as the normalized deformation speed index $V''_t$. In other words, $V''_t = V_t \cdot T_r^3$.

The ground contact time ratio calculating means 18 calculates a ground contact time ratio CTR by dividing the ground contact time $T_t$ calculated in the ground contact time calculating means 16 by the rotation time $T_r$ calculated in the rotation time calculating means 15.

That is, CTR=(Tt/Tr). The ground contact time ratio CTR is used as a measure of the load because the ground contact time ratio CTR is almost proportional to the load.

The wear measure calculating means 19 calculates a wear measure P, which is a parameter corresponding to the degree of wear of the tire. The wear measure P of the present invention is obtained by dividing the normalized deformation speed index $V''_t$, which is a conventional wear measure $P_V$, by the tire size of the tire concerned, and in this embodiment, a tire outer diameter D was used as the tire size.

In other words, the wear measure P of the present invention may be expressed as $P = V_t \cdot T_r^3 \cdot (1/D)$.

This is because the influence of the length of the tire, such as the tire outer diameter D, remains as the unit of the conventional wear measure $P_V$ is $[m/s^3][s^3]=[m]$. In contrast, the unit of the wear measure P of the present invention is dimensionless, so the influence of the tire size can be minimized.

Figure 6A:
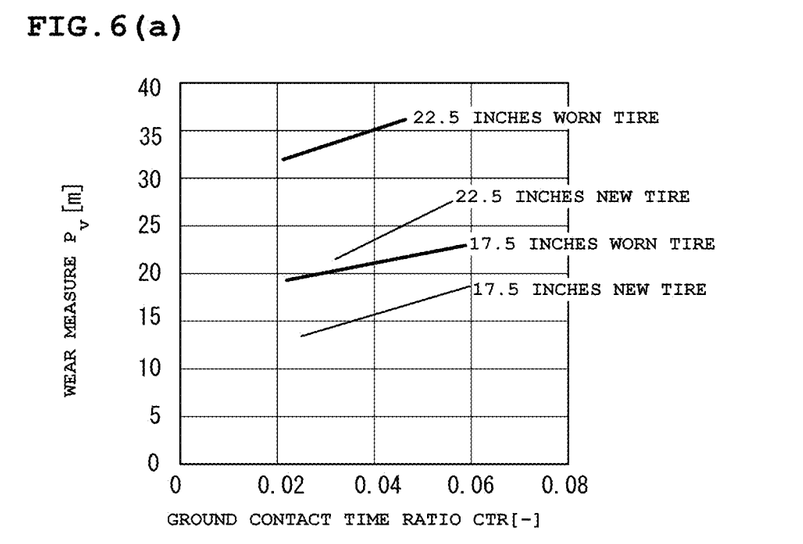
FIGS. 6A and 6B are diagrams respectively illustrating a relationship between a tire outer diameter and a wear measure.

In general, in a case where the degree of wear is the same level, the smaller the tire outer diameter is, the smaller the wear measure becomes. However, as illustrated in FIG. 6A, when the wear measure $P_V$ is used, the relationship between CTR and the conventional wear measure $P_V$ [m] is greatly influenced by the tire size (in this case, the tire outer diameter), such that the wear measure $P_V$ of a new tire with a larger outer diameter becomes larger than that of a worn tire with a smaller outer diameter.

Figure 6B:
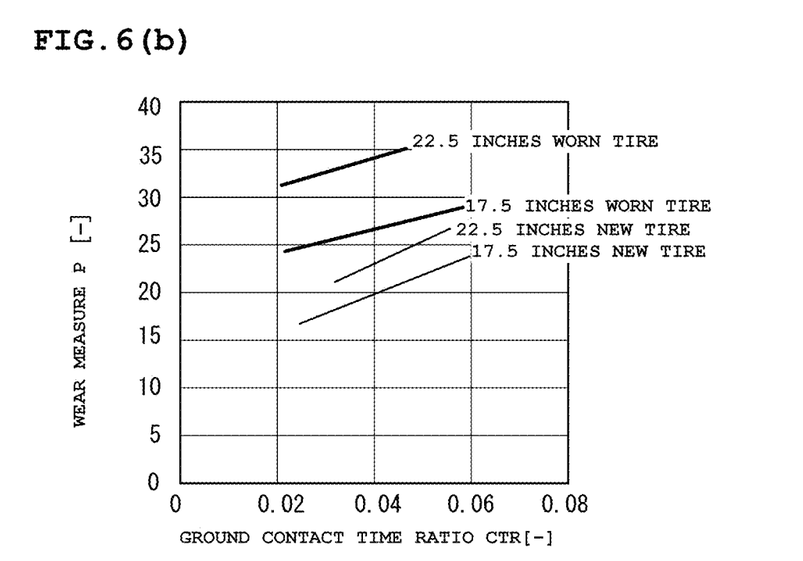

In contrast, when the wear measure P of the present invention is used, as illustrated in FIG. 6B, the new tire with a large outer diameter can be separated from the worn tire with a smaller outer diameter, hence it is understood that the influence of the tire outer diameter is minimized.

The data accumulating means 20 accumulates the data of the ground contact time ratio CTR which is the measure of load, and the data of the wear measure P, which have been obtained by running, under various load conditions, the vehicle equipped with the tire that is the target for estimating the degree of wear. The accumulation of data is performed until the number of data reaches a predetermined number N. When the number of data reaches the predetermined number N, N sets of data $(CTR_k, P_k)$ are sent to the tire wear estimating means 22 (k=1 to N).

The memory means 21 stores a CTR-P map 21M, which has been obtained in advance, for estimating the degree of wear of the tire.

Figure 7:
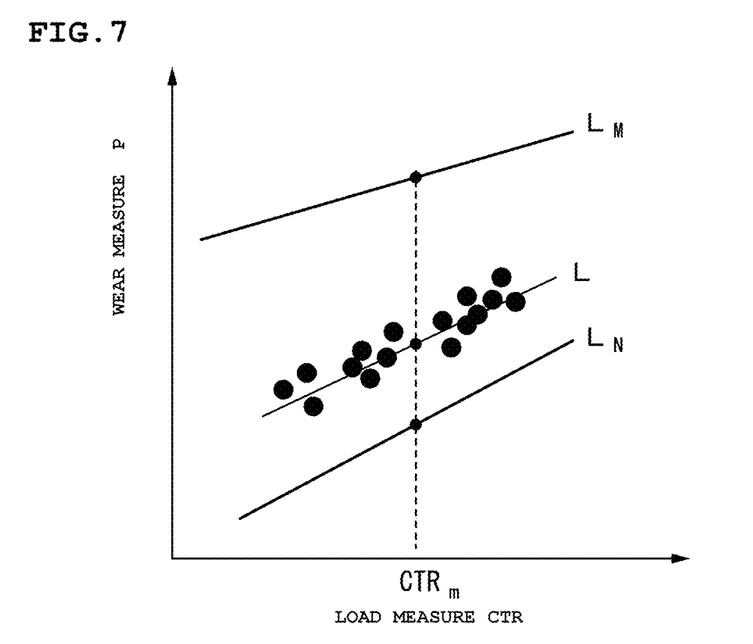
FIG. 7 is a diagram illustrating a relationship between a load measure and the wear measure.

As illustrated in FIG. 7, the CTR-P map 21M is a map in which a master line $L_M$ representing the relationship between the ground contact time ratio CTR and the wear measure $P_M$ of a worn tire with the remaining groove amount $Y_M$ and a master line $L_N$ representing the relationship between the ground contact time ratio CTR and the wear measure $P_N$ of a new tire with the remaining groove amount $Y_N$, are drawn on a plane in which the horizontal axis is the ground contact time ratio CTR and the vertical axis is the wear measure P. The above-mentioned relationships have been obtained in advance. In this embodiment, $Y_N$=19 mm and $Y_M$=3 mm.

Hereafter, a formula representing the master line $L_M$ is referred to as a worn tire approximate formula and a formula representing the master line $L_N$ is referred to as an approximate formula when a tire is new Next, an explanation is given as to how to obtain the worn tire approximate formula and the approximate formula when a tire is new.

The worn tire approximate formula is obtained from the data of the ground contact time ratio CTR and the data of the wear measure $P_N$ of the time when vehicles equipped with a plurality of tires of different sizes are run under various load conditions, respectively.

The above-mentioned data of the ground contact time ratio CTR and the data of the wear measure $P_N$ may be obtained by running a single vehicle with a plurality of tires of different sizes sequentially mounted on the vehicle, or by running a plurality of vehicles each equipped with a plurality of tires of a size different from other tires.

In this embodiment, the tire size is set to be a tire outer diameter D, a tire width W, and a tire height H, and parameters $\theta_1$ to $\theta_5$ are determined by regression learning, on the assumption that the wear measure $P_M$ can be expressed by the linear equation of CTR, D, (W/D) and (2T/D) as shown in Equation (1) below.

$$P_M = CTR \cdot \theta_1 + D \cdot \theta_2 + (W/D) \cdot \theta_3 + (2T/D) \cdot \theta_4 + \theta_5 \tag{1}$$

In this case, it is sufficient that the tire types to be used may be at least five types.

On the other hand, for the approximate formula when a tire is new, a vehicle equipped with new tires is run for the first few days of use, for example, to accumulate the data of the ground contact time ratio CTR which is the measure of load and the data of the wear measure P, and the accumulated data $(CTR_k, P_{Nk})$ are plotted, so as to obtain, by regression learning, a regression equation showing the relationship between the ground contact time ratio CTR and the wear measure $P_N$, as shown in Equation (2) below.

$$P_N = a_N \cdot CTR + b_N \tag{2}$$

The tire wear estimating means 22 estimates a remaining groove amount $Y_D$, which is the degree of wear of the tire, using the N sets of data $(CTR_k, P_k)$ sent from the data accumulating means 20 and the CTR-P map 21M stored in the memory means 21.

Specifically, first, as illustrated in FIG. 7, the N sets of data $(CTR_k, P_k)$ accumulated in the data accumulating means 20 are plotted on the CTR-P map 21M taken out from the memory means 21, and a target tire approximate formula is obtained, by regression learning, which is a regression line representing the relationship between the ground contact time ratio CTR and the wear measure P, as shown in Equation (3) below.

$$P = a \cdot CTR + b \tag{3}$$

The circles in the figure are the accumulated data $(CTR_k, P_k)$, and the straight line L is the straight line (regression line) representing the target tire approximate formula.

Next, a wear measure $P_m$ of the target tire approximate formula at a median value $CTR_m$ of the ground contact time ratio CTR, a wear measure $P_{Mm}$ of the worn tire approximate formula at the median value $CTR_m$, and a wear measure $P_{Nm}$ of a new tire approximate formula are obtained.

Figure 8:
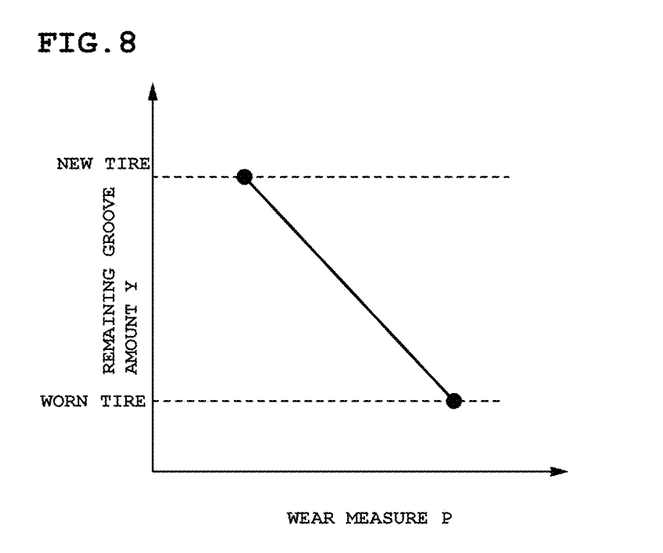
FIG. 8 is a diagram illustrating a relationship between the wear measure and a remaining groove amount of the tire.

As illustrated in FIG. 8, since the wear measure P and the remaining groove amount Y of the tire have a linear relationship, that is, the relationship in which ($\Delta Y/\Delta P$) is constant, the remaining groove amount $Y_D$ of the target tire can be obtained from the proportional equation shown in the Equation (4) below.

$$(P_m - P_{Nm}):(P_{Mm} - P_{Nm}) = (Y_D - Y_N):(Y_M - Y_N) \tag{4}$$

As described above, in this embodiment, the CTR-P map 21M is created using tires of multiple tire sizes, instead of performing actual vehicle tests for each tire size, so that the remaining groove amount $Y_D$, which is the degree of wear of the tire, can be estimated efficiently.

In addition, as the wear measure P to be used for creating the CTR-P map 21M and for estimating the remaining groove amount $Y_D$ of the target tire, the conventional wear measure $P_V$ divided by the tire size of the tire concerned is used so that the effect of the length can be reduced, hence the degree of wear of the tire can be accurately estimated.

Figure 9:
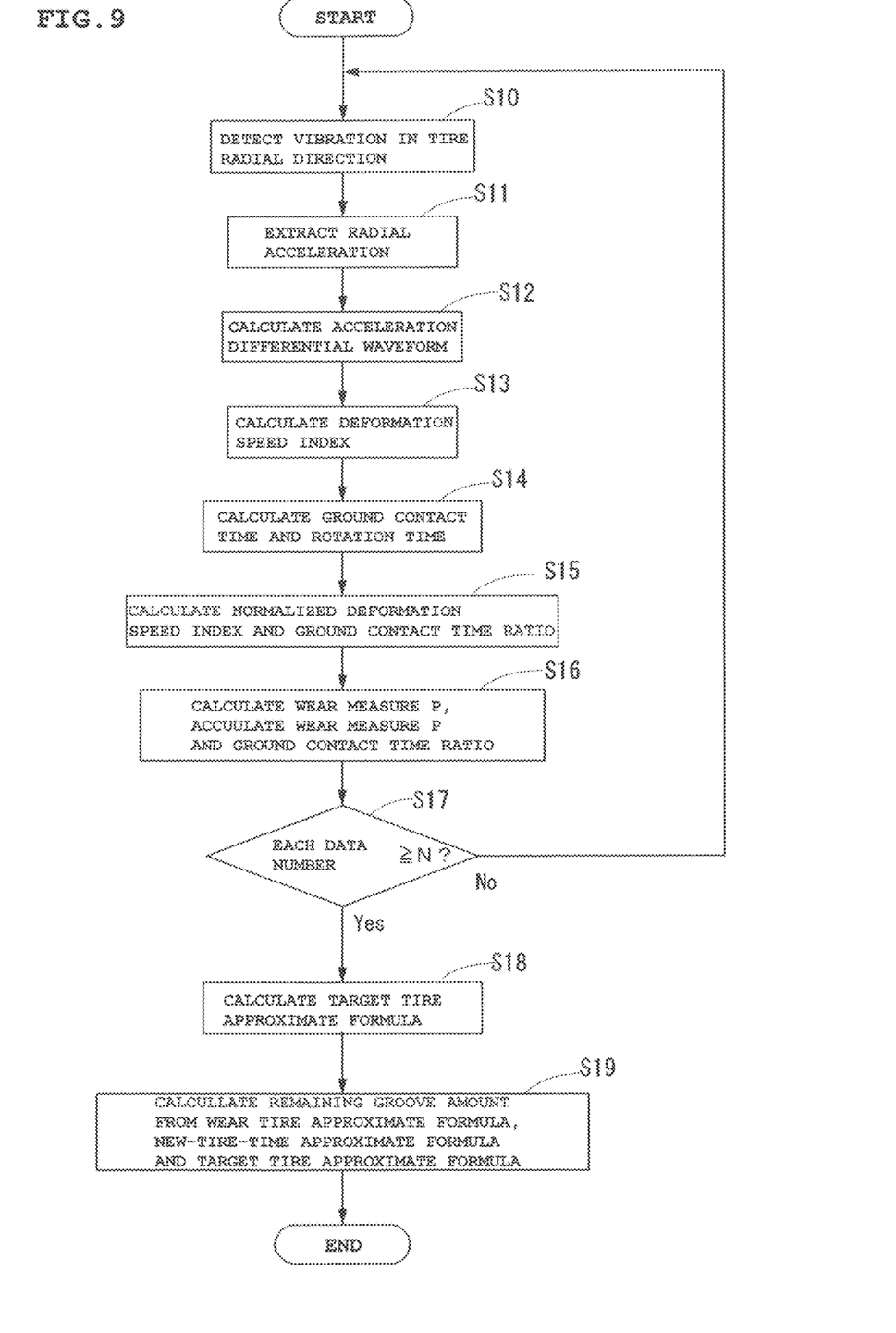
FIG. 9 is a flowchart illustrating a tire wear estimation method according to an aspect of the present invention.

Next, the tire wear estimation method according to the embodiment of the present invention will be described with reference to the flowchart of FIG. 9. Assume now that the worn tire approximate formula and the approximate formula when a tire is new of the CTR-P map 21M have already been created.

First, the tire radial vibration input from the road surface to the tire 1 is detected by the acceleration sensor 11 (Step S10), and thereafter, the radial acceleration is extracted by the acceleration waveform extracting means 12 (Step S11).

Next, the acceleration differential waveform, which is a waveform obtained by time-differentiating the time-series waveform of the radial acceleration by the acceleration differential waveform calculating means 13 (Step S12), and the differential peak value $V_{tf}$ at the leading-edge side, which is the magnitude of the peak $P_f$ at the leading-edge side of the acceleration differential waveform is calculated and this value is set as the deformation speed index $V_t$ (Step S13), and the ground contact time $T_f$, which is the interval between the peak $P_f$ at the leading-edge side and the peak $P_k$ at the trailing-edge side, and the rotation time $T_r$, which is the interval between the two peaks $P_{k1}$ and $P_{k2}$ at the trailing-edge side are calculated (Step S14).

Next, the normalized deformation speed index $V''_t$ is calculated by multiplying the deformation speed index $V_t$ by the cube of the rotation time in the normalized deformation speed index calculating means 17, and the ground contact time ratio CTR as the measure of load is calculated in the ground contact time ratio calculating means 18 (Step S15).

In step S16, the wear measure P is calculated by dividing the normalized deformation speed index $V''_t$ by the tire size of the tire concerned in the wear measure calculating means 19, and the data of the calculated wear measure P and the data of the ground contact time ratio CTR calculated in Step S15 are accumulated in the data accumulating means 20.

Next, judgement is made as to whether or not the number of data of the ground contact time ratio CTR and the number of data of the wear measure P accumulated in the data accumulating means 20 have respectively reached the predetermined number N (Step S17).

If it is judged in Step S17 that the number n of data of the ground contact time ratio CTR and the number n of data of the wear measure P have not reached the predetermined number N, the processes in Step S10 to Step S17 are repeated until the number n of data reaches the predetermined number N.

On the other hand, if the number n of data of the ground contact time ratio CTR and the number n of data of the wear measure P have reached the predetermined number N, the process proceeds to Step S18 and the target tire approximate formula representing the relationship between the ground contact time ratio CTR and the wear measure P is obtained, in the wear measure calculating means 19, by regression learning from N sets of data (CTR$_k$, P$_k$) sent from the data accumulating means 20.

Finally, the remaining groove amount $Y_D$ of the target tire is obtained by using the target tire approximate formula obtained in Step S18, the worn tire approximate formula where the remaining groove amount is $Y_M$, and the approximate formula when a tire is new where the remaining groove amount is $Y_N$. The worn tire approximate formula and the approximate formula when a tire is new have been obtained in advance (Step S19).

Although the present invention has been described using the embodiment, the technical scope of the present invention is not limited to the scope described in the above-described embodiment. It is apparent to those skilled in the art that various modifications or improvements can be made to the above-described embodiment. It is also apparent from the claims that such modifications or improvements may also be included in the technical scope of the present invention.

For example, in the above-described embodiment, as the wear measure P, one that is obtained by dividing the conventional wear measure $P_V$ by the outer diameter D of the tire concerned was used. However, the conventional wear measure $P_V$ may be divided by the length of one tire round TL=$\pi$D, or may be divided by the tire width W or the tire height H and so on.

In addition, in the above-described embodiment, the wear measure $P_M$ used for the CTR-P map 21M was represented by a linear expression of CTR, D, (W/D) and (2T/D), but another linear expressions may be used, for example, such as $P_M$=CTR·$\theta_1$+D·$\theta_2$+$\theta_5$. However, when the number of tire sizes used is few, accuracy of the master line $L_M$ decreases, thus, it is preferable to use at least three tire sizes, as in the present embodiment.

In the above-described embodiment, the tire sizes used to create the master line $L_M$ were the tire outer diameter D, the tire width W, and the tire height H, however, other tire sizes such as a flatness ratio and a load index may also be used.

In addition, in the above-described embodiment, the relational expression representing the relationship between the wear measure $P_N$ and the ground contact time ratio CTR of the new tire used for the CTR-P map 21M was obtained from the data of the time when the new tire was running, but as similar to the relational expression representing the relationship between the wear measure $P_M$ and the ground contact time ratio CTR of the worn tire, the new tire approximate formula, which was obtained from the data of the ground contact time ratio CTR and the data of the wear measure $P_M$ at the time when vehicles equipped with a plurality of tires of different sizes were respectively driven under various load conditions, may be used. In this case, however, the number of actual vehicle tests needs to be increased.

On the other hand, in the case where the approximate formula when a tire is new, which is the relational expression representing the relationship between the wear measure $P_N$ and the ground contact time ratio CTR of the new tire, is used, since the degree of wear can be obtained by using the tire for which the degree of wear is to be estimated, without performing actual vehicle tests, the accuracy of the estimation of the degree of wear of the tire becomes higher. Thus, it is preferable to use the approximate formula when a tire is new than using the new tire approximate formula.

In summary, the present invention may also be described as follows.

(1) A tire wear estimation method for estimating a degree of wear of a tire, in which a normalized deformation speed index is set as a wear measure representing the degree of wear of the tire, the normalized deformation speed index being obtained by normalizing, by a rotation time of the tire, an index of a deformation speed at an edge of a tire contact patch or near the edge of the tire contact patch, the index being calculated from magnitude or magnitudes of one or both of positive and negative peaks appearing in a radial acceleration waveform obtained by differentiating a time-series waveform of tire radial acceleration detected by an acceleration sensor mounted on the tire, the rotation time being a time interval of peaks of either one of the positive and negative peaks appearing in the radial acceleration waveform; and the degree of wear of the tire is estimated using the wear measure and a ground contact time ratio which is a ratio of a ground contact time with respect to the rotation time, the ground contact time being a time interval between the positive peak and the negative peak, wherein the degree of wear of the tire is estimated using the wear measure, the ground contact time ratio and a relationship, which has been obtained in advance, between the wear measure and the ground contact time ratio obtained by running a plurality of tires having tire sizes different from each other.

(2) The tire wear estimation method according the above (1), in which the tire size includes an outer diameter, a tire width, and a cross-sectional height of the tire.

(3) The tire wear estimation method according to the above (1) or (2), in which the wear measure is obtained by using:

a worn tire approximate formula that approximates a relationship between a ground contact time ratio and a wear measure of a worn tire, obtained by using data of the ground contact time ratio and data of the wear measure of each of worn tires that are obtained by running, under a plurality of load conditions, a plurality of tires that were worn by a predetermined amount and that had outer diameters, tire widths, and cross-sectional heights different from each other when the tires were new, a new tire approximate formula that approximates a relationship between a ground contact time ratio and a wear measure of a new tire, obtained by using data of the ground contact time ratio and data of the wear measure of each of new tires that are obtained by running, under the plurality of load conditions, a plurality of new tires having outer diameters, tire widths, and cross-sectional heights different from each other, and a target tire approximate formula that approximates a relationship between a ground contact time ratio and a wear measure of a tire for which the degree of wear is to be estimated, the target tire approximate formula being obtained by using data of a ground contact time ratio and data of a wear measure that are accumulated for a predetermined number by running the tire for which the degree of wear is to be estimated.

(4) The tire wear estimation method according to the above (3), in which the wear measure is obtained by using, in place of the new tire approximate formula, an approximate formula when a tire is new that approximates a relationship between a ground contact time ratio and a wear measure of the time when the tire for which the degree of wear is to be estimated is new, and that is obtained by using data of the ground contact time ratio and data of the wear measure accumulated for a predetermined number by running the tire for which the degree of wear is to be estimated when the tire is new.

(5) The tire wear estimation method according any of the above (1) to (4), in which a value obtained by dividing the wear measure by the tire size of the tire concerned is set as a new wear measure and the degree of wear of the tire concerned is estimated by using the new wear measure.

REFERENCE SIGN LIST

1 Tire, 2 Inner liner section, 3 Tire air chamber, 4 Tread,
10 Tire wear estimation device, 11 Acceleration sensor,
12 Acceleration waveform extracting means,
13 Acceleration differential waveform calculating means,
14 Deformation speed index calculating means,
15 Rotation time calculating means,
16 Ground contact time calculating means,
17 Normalized deformation speed index calculating means,
18 Ground contact time ratio calculating means,
19 Wear measure calculating means,
20 Data accumulating means, 21 Memory means
21M CTR-P map, 22 Tire wear estimating means.

The invention claimed is:

1. A tire wear estimation method for estimating a degree of wear of a tire, in which a normalized deformation speed index is set as a wear measure representing the degree of wear of the tire, the normalized deformation speed index being obtained by normalizing, by a rotation time of the tire, an index of a deformation speed at an edge of a tire contact patch or near the edge of the tire contact patch, the index being calculated from magnitude or magnitudes of one or both of positive and negative peaks appearing in a radial acceleration waveform obtained by differentiating a time-series waveform of tire radial acceleration detected by an acceleration sensor mounted on the tire, the rotation time being a time interval of peaks of either one of the positive and negative peaks appearing in the radial acceleration waveform; and the degree of wear of the tire is estimated using the wear measure and a ground contact time ratio which is a ratio of a ground contact time with respect to the rotation time, the ground contact time being a time interval between the positive peak and the negative peak, wherein the degree of wear of the tire is estimated using the wear measure, the ground contact time ratio and a relationship, which has been obtained in advance, between the wear measure and the ground contact time ratio obtained by running a plurality of tires having tire sizes different from each other.

2. The tire wear estimation method according to claim 1, wherein the tire size includes an outer diameter, a tire width, and a cross-sectional height of the tire.

3. The tire wear estimation method according to claim 1, wherein the wear measure is obtained by using:

a worn tire approximate formula that approximates a relationship between a ground contact time ratio and a wear measure of a worn tire, obtained by using data of the ground contact time ratio and data of the wear measure of each of worn tires that are obtained by running, under a plurality of load conditions, a plurality of tires that were worn by a predetermined amount and that had outer diameters, tire widths, and cross-sectional heights different from each other when the tires were new, a new tire approximate formula that approximates a relationship between a ground contact time ratio and a wear measure of a new tire, obtained by using data of the ground contact time ratio and data of the wear measure of each of new tires that are obtained by running, under the plurality of load conditions, a plurality of new tires having outer diameters, tire widths, and cross-sectional heights different from each other, and a target tire approximate formula that approximates a relationship between a ground contact time ratio and a wear measure of a tire for which the degree of wear is to be estimated, the target tire approximate formula being obtained by using data of a ground contact time ratio and data of a wear measure that are accumulated for a predetermined number by running the tire for which the degree of wear is to be estimated.

4. The tire wear estimation method according to claim 3, wherein the wear measure is obtained by using, in place of the new tire approximate formula, an approximate formula when a tire is new that approximates a relationship between a ground contact time ratio and a wear measure of the time when the tire for which the degree of wear is to be estimated is new, and that is obtained by using data of the ground contact time ratio and data of the wear measure accumulated for a predetermined number by running the tire for which the degree of wear is to be estimated when the tire is new.

5. The tire wear estimation method according to claim 1, wherein a value obtained by dividing the wear measure by the tire size of the tire concerned is set as a new wear measure and the degree of wear of the tire concerned is estimated by using the new wear measure.

* * * * *